(12) United States Patent
Vineis

(10) Patent No.: US 8,051,635 B2
(45) Date of Patent: Nov. 8, 2011

(54) LAWN MOWER

(76) Inventor: Donna Vineis, Lansdale, PA (US)

( * ) Notice: Subject to any disclaimer, the term of this patent is extended or adjusted under 35 U.S.C. 154(b) by 93 days.

(21) Appl. No.: 11/539,916

(22) Filed: Oct. 10, 2006

(65) Prior Publication Data

US 2008/0083204 A1    Apr. 10, 2008

(51) Int. Cl.
*A01D 43/06* (2006.01)
(52) U.S. Cl. .......................................................... 56/202
(58) Field of Classification Search ............... 56/5, 16.6, 56/194, 202–203, DIG. 9
See application file for complete search history.

(56) References Cited

U.S. PATENT DOCUMENTS

| 3,726,069 | A | * | 4/1973 | Cope ................................. 56/202 |
| 4,566,257 | A | | 1/1986 | Akrabawi |
| 4,674,127 | A | * | 6/1987 | Yamada et al. .................... 383/6 |
| 4,747,259 | A | | 5/1988 | Kline et al. |
| 4,989,400 | A | | 2/1991 | Wark |
| 5,003,758 | A | * | 4/1991 | Bernstein ......................... 56/202 |
| 5,181,628 | A | * | 1/1993 | Okezie ....................... 220/495.08 |
| 5,365,727 | A | * | 11/1994 | Cross ................................. 56/194 |
| 5,564,265 | A | * | 10/1996 | Pitt .................................... 56/202 |
| 6,735,930 | B2 | * | 5/2004 | Sugiyama et al. .............. 56/202 |
| 2002/0144495 | A1 | * | 10/2002 | Sugiyama et al. .............. 56/202 |
| 2006/0168932 | A1 | * | 8/2006 | Toporski .......................... 56/202 |

\* cited by examiner

*Primary Examiner* — Thomas Will
*Assistant Examiner* — Mai Nguyen
(74) *Attorney, Agent, or Firm* — Howson & Howson LLP

(57) ABSTRACT

A lawn mower for mowing lawn. There is: a lawn mower base, having a first transport hole; an external collection container, having a second transport hole and a first transport flap; and an internal collection container having a third transport hole and a first elongated ductile connection member. There is also a second elongated ductile connection member coupled to the internal collection container. The transport flap is removably coupled to the external collection container by zipping. The internal collection container comprises a plurality of slit portions. The external connection container comprises a plurality of connection hooks, and the internal collection container comprises a plurality of connection bands. The internal collection container comprises a plurality of ventilation holes opposite the third transport hole.

2 Claims, 5 Drawing Sheets

LAWN MOWER

BACKGROUND OF THE INVENTION

1. Field of the Invention

The present invention relates to lawn mowers, specifically to lawn mowers having removable bags for collecting and disposing of grass clippings.

2. Description of the Related Art

In the related art, it has been known to use lawn mowers to mow lawns. It has also been known that many lawn mowers have a bag and/or other accessories for collecting grass clippings. Most of these accessories utilize some type of bag or container attachment to the lawn mower to collect the grass clippings.

While lawn mower bag or container attachments most often adequately collect the mowed grass, they frequently become filled during one mowing session, resulting in the need to periodically stop the lawn mower, detach the collecting bag or container from the lawn mower, empty the bag or container into a receptacle for ultimate disposal, and reattach the collecting bag or container to the mower—all a time consuming process. Emptying of the collecting bag or container is also often a bulky and awkward process. In addition, clippings are frequently spilled and require extra effort to collect. Furthermore, these collecting bags or containers are usually made out of a canvas or like material which wears out easily and frequently needs to be replaced.

Accordingly, there is a need for improved lawn mowers, bags, and the like. Some improvements have been made in the field. Examples include but are not limited to the references described below, which references are incorporated by reference herein:

U.S. Pat. No. 4,566,257, issued to Akrabawi, discloses a lawn mower disposable grass collection bag attachment. An improvement for a lawn mower of the type that propels clippings and a stream of air from its cutting area which improvement allows it to collect the clippings in a horizontally disposed plastic trash bag is disclosed. Transfer means, a plate with an opening sized to the mower discharge chute, is releasably mounted on the mower against the chute to receive the clippins and stream of air and pass them through it in one direction. The plate defines a vent opening to allow air to vent in the opposite direction, and has means for releasably affixing the disposable bag's opening's marginal areas in a generally vertical plane such that the bag encloses both the vent and clipping openings, so that clippings and air propelled into the horizontally disposable bag and air are vented from it. Several embodiments of transfer plate are disclosed for retrofitting different mowers, and several embodiments of different means for affixing the bag are disclosed, including a rectangular bracket that sandwiches the plastic of the trash baq against a conformingly shaped channel in the plate and is held there by spring clips and a horizontal groove or channel that receives a spring-loaded chain of shock cord. A safety container that supports and substantially surrounds the plastic baq is mounted to the mower and its handle This container has its top formed to be openable so as to be able to remove filled bags and replace them with new ones. The safety container has a pocket for holding and carrying a supply of empty plastic trash bags.

U.S. Pat. No.: 4,989,400, issued to Wark, discloses a disposable bag and mounting apparatus for a lawn mower. A disposable bag for collecting grass clippings or the like has ventilation holes in only a portion of its surface. The bag has a narrow mouth mounted to a connector assembly, or, alternatively, directly to a discharge chute of a mower. The disposable bag is supported by a cradle assembly mounted to the handlebars of the mower.

U.S. Pat. No.: 4,747,259, issued to Kline et al., discloses a grass catching assembly and disposable bag therefore. A grass catching assembly for a lawn mower includes an adapter assembly attachable to the grass discharge area of the mower. A disposable bag is attached to the adapter so that mowed grass from the mower is passed through the adapter and into the disposable bag.

The inventions heretofore known suffer from a number of disadvantages which include: being heavy, being difficult to install, being difficult to remove, being difficult to access, being difficult to use, not being disposable, and/or not being biodegradable.

What is needed is a lawn mower that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available lawn mowers. Accordingly, the present invention has been developed to provide a lawn mower for mowing lawns.

In one embodiment, there is a lawn mower for mowing lawns, including: a lawn mower base, configured to mow lawns, having: a first transport hole, configured to transport grass clippings therethrough; an external collection container, removably coupled to the lawn mower base, having: a second transport hole, substantially juxtaposed with the first transport hole, and/or configured to transport grass clippings therethrough; and/or a first transport flap, removably coupled to the external collection container at a location substantially different than the second transport hole, and/or configured to selectably transport grass clippings therethrough; and/or an internal collection container, removably coupled to the external collection container, and/or insertably coupleable into the external collection container, having: a third transport hole, substantially aligned with the second transport hole, substantially juxtaposed with the first transport hole, and/or configured to transport grass clippings therethrough; and/or a first elongated ductile connection member, disposed near a top side of the third transport hole, and/or removably coupleable to the external collection container near the second transport hole.

In another embodiment, a lawn mower includes: a second elongated ductile connection member, which may be disposed near a bottom side of the third transport hole, and/or removably coupleable to the external collection container near the second transport hole, wherein the first and/or second elongated ductile connection members may be substantially parallel. In still another embodiment, the first transport flap may be removably coupled to the external collection container by zipping. In yet another embodiment, the internal collection container includes a plurality of slit portions, disposed near a top of the internal collection container, and/or disposed longitudinally along the internal collection container.

In a further embodiment, the external collection container includes a plurality of connection hooks, which may be disposed near the second transport hole, and/or configured to coupled the external collection container to the lawn mower base; and/or the internal collection container includes a plurality of connection bands, which may be disposed near the third transport hole, selectably coupleable to the connection hooks, and/or configured to couple the internal collection container to the external collection container. In still a further embodiment, the internal collection container includes a plurality of ventilation holes, configured to provide air flow. In yet a further embodiment, the ventilation holes may be disposed along a side of the internal collection container opposite the third transport hole.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
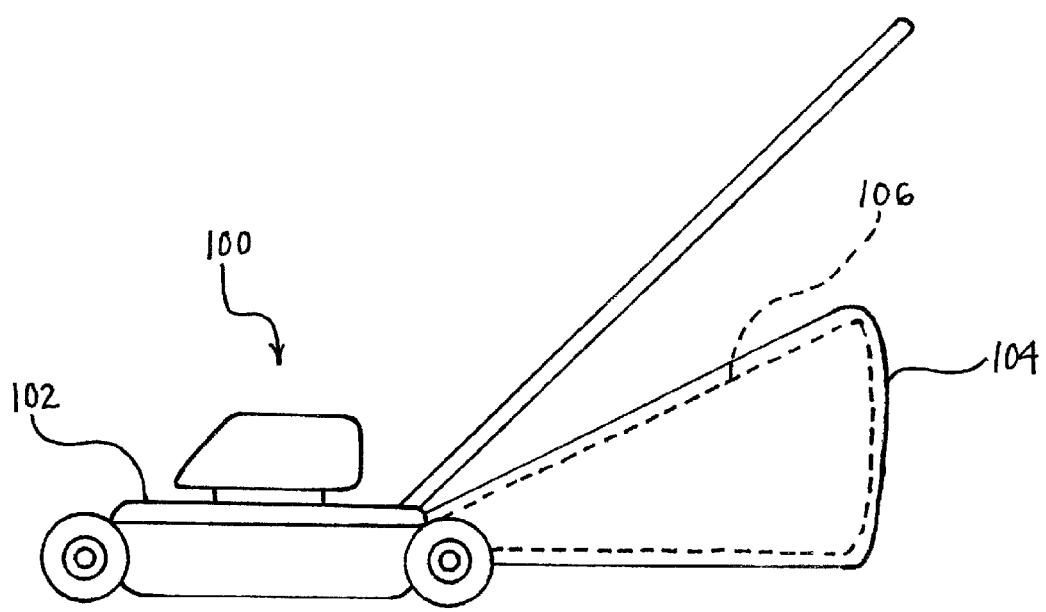
FIG. 1 is a side elevational view of a lawn mower, according to one embodiment of the invention.
Figure 2:
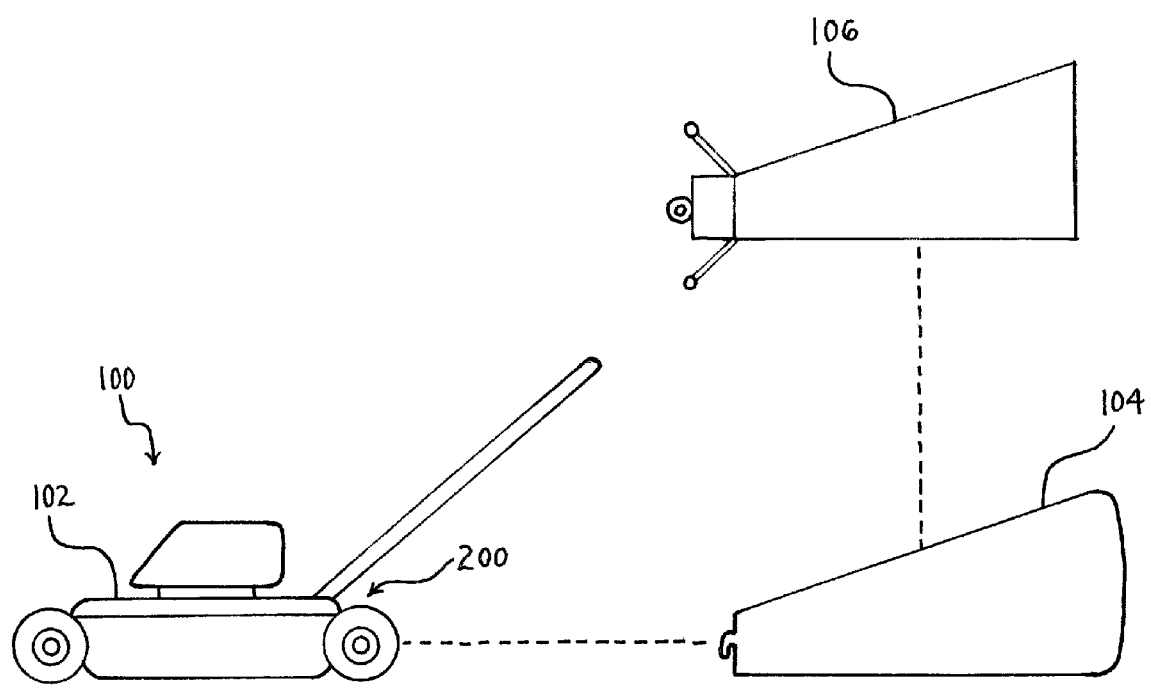
FIG. 2 is an exploded side elevational view of a lawn mower, according to one embodiment of the invention.
Figure 3:
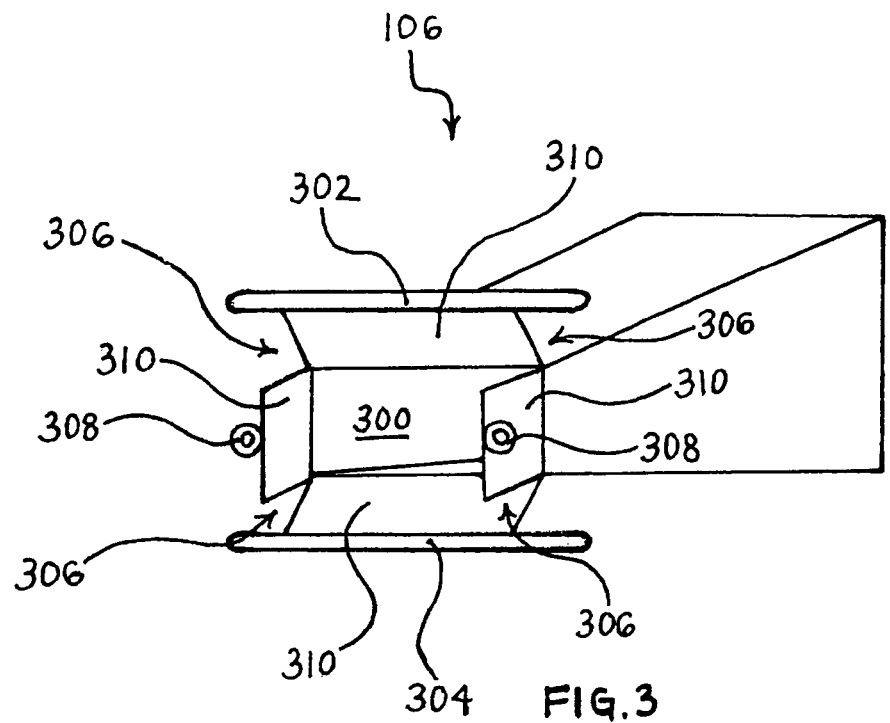
FIG. 3 is a front perspective view of an internal collection container, according to one embodiment of the invention.
Figure 4:
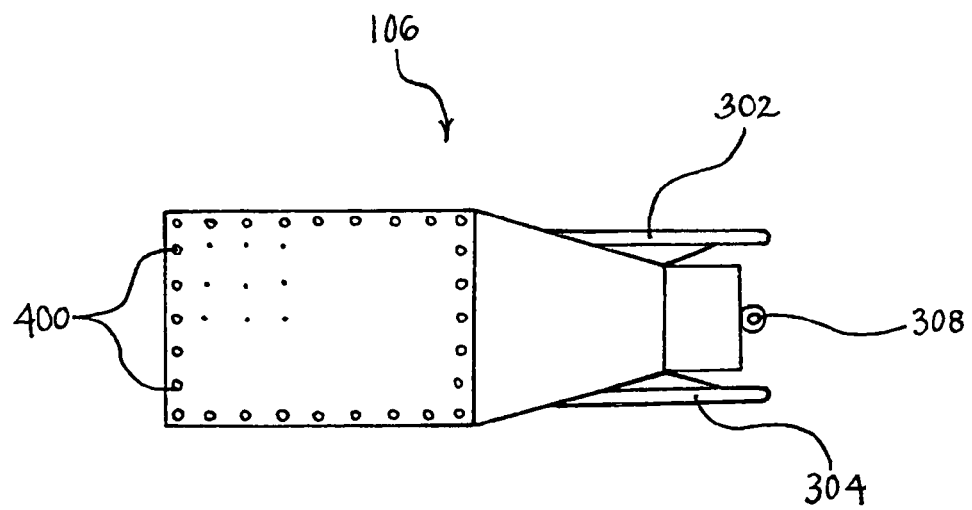
FIG. 4 is a rear perspective view of an internal collection container, according to one embodiment of the invention.
Figure 5:
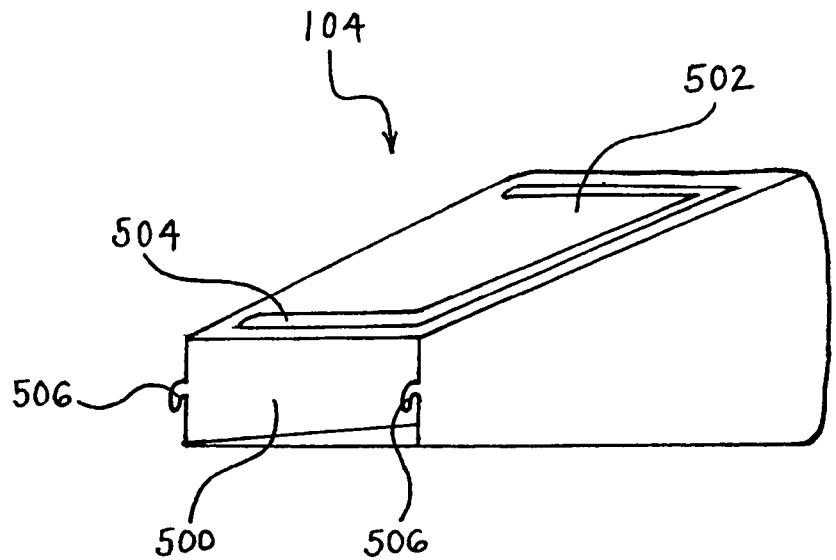
FIG. 5 is a front perspective view of an external collection container, according to one embodiment of the invention.
Figure 6:
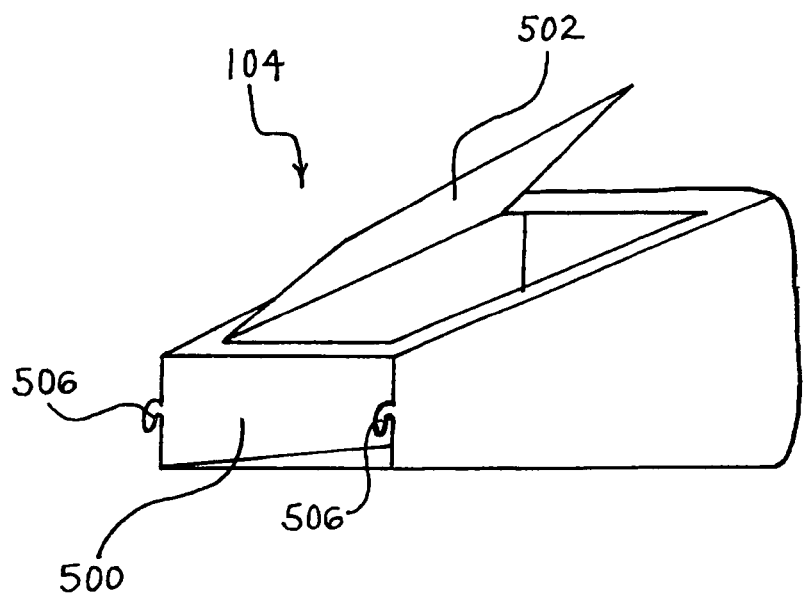
FIG. 6 is a front perspective view an external collection container, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Looking to Figures, there is illustrated a lawn mower 100 for mowing lawns. The lawn mower 100 has a lawn mower base 102, configured to mow lawns. Coupled to the lawn mower base 102 is an external collection container 104 for collecting grass clippings. The lawn mower base 102 and external collection container 104 may be any known in the art, such as the lawn mower base 102 and the external collection container 104 of the SR4 Super Recycler by The Toro Company of Bloomington, Minn. Disposed within the external collection container 104 is an internal collection container 106. The internal collection container 106 is also for collecting grass clippings. Advantageously, the internal collection container 106 may be a disposable and/or biodegradable bag.

Also, according to the Figures, the lawn mower base 102 has a first transport hole 200 configured to transport grass clippings therethrough. The external collection container 104 has a second transport hole 500, substantially juxtaposed with the first transport hole 200, for transporting grass clippings therethrough. Additionally, the internal collection container 106 has a third transport hole 300, substantially aligned with the second transport hole 500, and substantially juxtaposed with the first transport hole 200, for transporting grass clipping therethrough. In one embodiment, the third transport hole 300 is substantially aligned with the second transport hole 500 so that the third transport hole 300 is disposed within the second transport hole 500. Also, in one embodiment, the third transport hole 300 is substantially juxtaposed with the first transport hole 200 so that the third transport hole 300 and the first transport hole 200 are disposed side-by-side. In operation, grass clippings are transported from the lawn mower base 102, through a first transport hole 200, and into the external collection container 104 and/or the internal collection container 106 through the second transport hole 500 and/or the third transport hole 300.

Further, as illustrated by the Figures, the internal collection container 106 has a plurality of slit portions 306, alternating with a plurality of internal container flaps 310. As shown, the plurality of slit portions 306, and the plurality of internal container flaps 310, are disposed near a top of the internal collection container 106. In addition, the plurality of slit portions 306 are disposed longitudinally along the internal collection container 106. In one embodiment of the invention, a top of the internal collection container 106 may be longitudinally cut, creating a plurality of slit portions 306 and a plurality of internal container flaps 310 thereby.

Also illustrated by the Figures, the internal collection container 106 has a plurality of connection bands 308. Correspondingly, the external collection container 104 has a plurality of connection hooks 506. In operation, the internal collection container 106 is coupled to the external connection container 104 by inserting the internal collection container 106 into the external connection container 104, and coupling the plurality of connection bands 308 to the plurality of connection hooks 506. Advantageously, the plurality of slit portions 306 allow for flexibility of the internal collection container 106, and allow the plurality of connection hooks 506 to extend into an interior of the internal collection container 106 for coupling to the plurality of connection bands 308.

There is also illustrated by the Figures, a first transport flap 502, removably coupled to the external collection container 104 by zipping 504. The first transport flap 502 is removably coupled to the external collection container 104 at a location substantially different than the transport hole so that the first transport flap 502 may be opened while the external collection container 104 is coupled to the lawn mower base 102. Also shown, are a plurality of ventilation holes 400, configured to provide air flow through the internal collection container 106.

In addition, the Figures illustrate a first elongated ductile connection member 302, and a second elongated ductile connection member 304, coupled to the internal collection container 106. In one embodiment, the first elongated ductile connection member 302 is coupled to a first edge (not shown) of the internal collection container 106, and the second elongated ductile connection member 304, is coupled to a second edge (not shown) of the internal collection container 106, substantially parallel to the first edge, so that the first elongated ductile connection member 302 and the second elongated ductile connection member 304 extend in the same direction. The first elongated ductile connection member 302 and the second elongated ductile connection member 304 may be coupled to the internal collection container 106 through a variety of different coupling mechanisms, such as, but not limited to: stitching, ties, adhesives, hook and loop, and/or hooks.

In one embodiment, the first elongated ductile connection member 302 and the second elongated ductile connection member 304 couple the internal collection container 106 to the external connection container 104 by wrapping around the second transport hole 500 and/or the plurality of connection hooks 506. In another embodiment, the first elongated ductile connection member 302 and the second elongated ductile connection member 304 do not couple the internal collection container 106 to the external collection container 104. Rather, in one embodiment, the internal collection container 106 is removed from the external collection container 104, and the first elongated ductile connection member 302 and the second elongated ductile connection member 304 seal the third transport hole 300 of the internal collection container 106 for disposal. For example, the first elongated ductile connection member 302 and the second elongated ductile connection member 304 may seal the third transport hole 300 of the internal collection container 106 by rolling down a length (not shown) of the internal collection container 106, and wrapping around the internal collection container 106.

In operation of one embodiment, a user couples an internal collection container 106 to an external collection container 104 by coupling a plurality of connection bands 308 to a plurality of connection hooks 506, and by twisting a first elongated ductile connection member 302 and a second elongated ductile connection member 304 around a second transport hole 500 and/or a plurality of connection hooks 506. The user then couples the external collection container 104 to a lawn mower base 102, and mows a lawn. The lawn mower base 102 clips grass and transports the grass clippings into the internal collection container 106, which is supported by the external collection container 104.

When the internal collection container 106 becomes full, a user detaches the external collection container 104, with the internal collection container 106, from the lawn mower base 102. The user also detaches the internal collection container 106 from the external collection container 104 by uncoupling the plurality of connection bands 308 from the plurality of connection hooks 506, and untwisting the first elongated ductile connection member 302 and the second elongated ductile connection member 304 from around the second transport hole 500 and/or the plurality of connection hooks 506. Then the user unzips the first transport flap 502 and removes the internal collection container 106 from the external collection container 104.

The user then seals the internal collection container 106 for disposal by aligning the first elongated ductile connection member 302 with the second elongated ductile connection member 304, rolling the internal collection container 106 around the first elongated ductile connection member 302 and the second elongated ductile connection member 304, and bending the first elongated ductile connection member 302 and the second elongated ductile connection member 304 around the internal collection container 106.

Advantageously, the first elongated ductile connection member 302 and the second elongated ductile connection member 304 may allow the third transport hole 300 of internal collection container 106 to remain open during mowing. Also, beneficially, the first elongated ductile connection member 302 and the second elongated ductile connection member 304 may allow a user to securely seal the internal collection container 106 as previously described, so that its contents are not spilled during transport of the internal collection container 106 to a disposal container, such as a garbage can. Further to a user's advantage, the first elongated ductile connection member 302 and the second elongated ductile connection member 304 may provide the user with a place to grip the internal collection container 106 during transport to a disposal container. For example, the first elongated ductile connection member 302 and the second elongated ductile connection member 304 may be formed into handles which may be gripped by a user.

Figure 7:
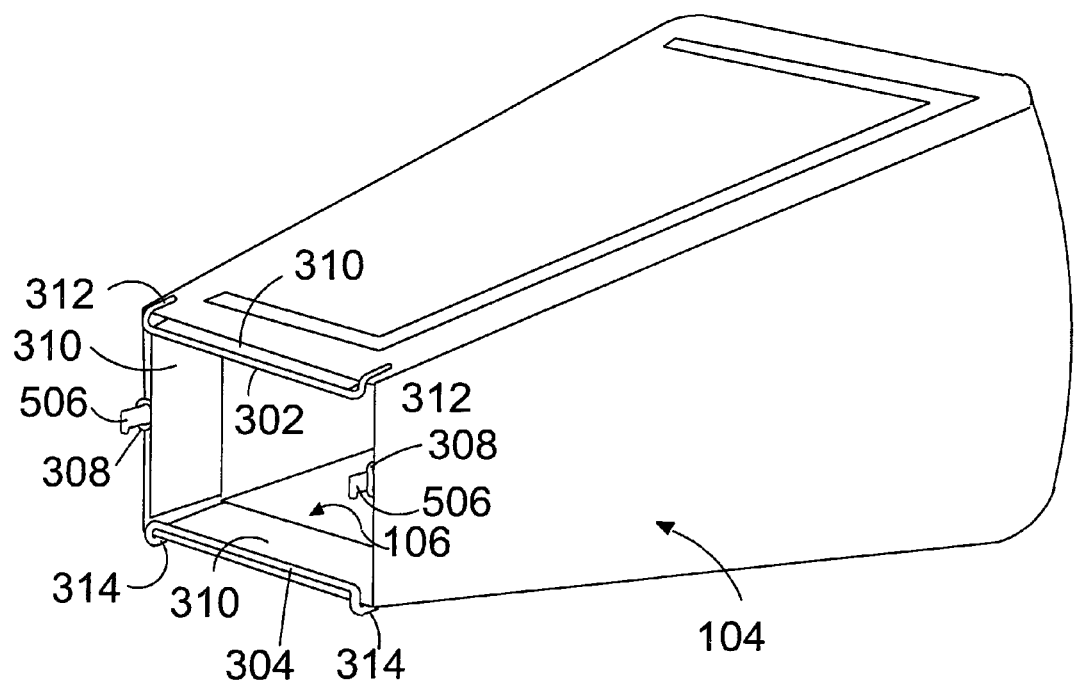
FIG. 7 is a front perspective view showing an internal collection container disposed inside an external collection container and illustrating the manner in which the opening of the internal collection container is held in an open condition.

As shown in FIG. 7, the internal collection container 104 is disposed inside the external collection container 106. The opening of the internal container is located in juxtaposition to the opening of the external container. Ends 312 of member 302 are bent over the top edge of the opening of the external container and engaged with the outside of the external container. Ends 314 of member 304 are similarly bent around the bottom edge of the opening of the external container and engaged with the outside of the external container. The engagement of the ends 312 and 314 with the outside of the external container maintains the opening of the internal container in an open condition so that it can receive clippings discharged by the mower. The connection bands 308 can also be looped around hooks 506 to hold the side flaps 310 in an open condition.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the first transport flap 502 is removably coupled to the external collection container by zipping, the first transport flap 502 may be removably coupled to the external collection container by a variety of coupling mechanisms. Some non-limiting examples of coupling mechanisms include: hook and loop, tying, buttoning, and adhesion.

Also, although the plurality of ventilation holes 400 are illustrated disposed along a side of the internal collection container 106 opposite the third transport hole 300, the plurality of ventilation holes 400 may be disposed at any location on the internal collection container 106 which provides for air flow.

Further, although the plurality of slit portions 306 are shown at four corners of the internal collection container 106, the slit portions 306 may be disposed at any location near a top of the internal collection container 106 to accommodate the plurality of connection hooks 506.

Additionally, although the Figures illustrate an external collection container 104, and an internal collection container 106, a user may couple the internal collection container 106 directly to the lawn mower base 102 so that an external collection container 104 is unnecessary for support of the internal collection container 106. For example, a user may couple the internal collection container 106 to a handlebar of a lawnmower base 102 by tying, hook and loop, adhesion, hooks, and any other coupling mechanism known in the art.

In addition, although the figures illustrate a plurality of connection bands 308, any number of connection bands 308 may be used, such as one, three, or four. Similarly, although the two elongated ductile connection members 302, 304 are shown, any number of elongated ductile connection members 302 may be used, such as one, three, or four, for example.

In a further example, the connection bands 308 may also be any connector known in the art. Some non-limiting examples of connectors may be: elastic bands, hard metal bands, ties, adhesives, and hook and loop.

It is also envisioned that the internal collection container 106 may be a disposable and/or biodegradable bag. As non-limiting examples, the internal collection container 106 may be: plastic, burlap, and/or paper.

It is expected that there could be numerous variations of the design of this invention. For example, the external collection container 104 and the internal collection container 106 may have any shape, such as, but not limited to: cubed, oblong, rectangular, trapezoidal, rhomboidal, etc.

Finally, it is envisioned that the components of the device may be constructed of a variety of materials. Some non-limiting examples include: plastic, paper, burlap, metal, nylon, latex, rubber, and/or vinyl.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. Lawn mowing and grass clipping collection apparatus comprising:

a mower having a grass clipping discharge opening;

an outer collection container removably connected to the mower, the outer collection container having an outer surface and an intake opening positioned to receive grass clippings discharged substantially horizontally through the discharge opening of the mower the intake opening being defined by an edge disposed substantially in a vertical plane, and an openable flap closing a second opening at a location spaced from the intake opening; and a disposable inner collection container in the form of a flexible bag having an opening for receiving grass clippings, the inner collection container being disposed inside the outer collection container, the opening of the bag being substantially rectangular and having first and second opposite edges each having a length, the opening of the bag being disposed adjacent the intake opening of the outer collection container and positioned to receive grass clippings discharged through the discharge opening of the mower;

two elongated, bendable, members secured to the inner collection container respectively along said opposite edges of the opening of the bag, each of the elongated members being longer than the length of the edge of the bag opening along which it is secured, and each of the elongated members having first and second opposite end portions, the first end portion of each elongated member being extendible in spaced relationship to the bag beyond one end of the bag opening edge along which it is secured and the second end portion of each elongated member being extendible in spaced relationship to the bag beyond the other end of the bag opening edge along which it is secured, said end portions of the elongated members being bent so that at least a part of each of said first and second end portions is in engagement with the outer surface of the outer collection container, the elongated, bendable, members being secured to the opposite edges of the bag opening along said opposite edges at locations such that the engagement of said parts of the end portions of the elongated members with said outer surface maintains the opening of the bag in an open condition for receiving grass clippings discharged by the mower;

wherein the second opening of the outer collection container is sufficiently large that, when the flap is opened, the inner collection container, when full of clippings, can be removed through the second opening; and wherein said end portions of the elongated members are alternatively bendable about said inner collection container to maintain the opening of the inner collection container in a closed condition when removed from the outer collection container.

2. Lawn mowing and grass clipping collection apparatus according to claim 1, wherein, at least from the intake opening to a location spaced from the intake opening, cross-sections of the outer collection container in planes parallel to the intake opening become progressively larger with increasing distance from the intake opening, and wherein, at least from the opening of the bag to a location spaced from the opening of the bag, cross-sections of the bag in planes parallel to the opening of the bag become progressively larger with increasing distance from the opening of the bag.

* * * * *